US010416423B2

(12) United States Patent
Zhao et al.

(10) Patent No.: US 10,416,423 B2
(45) Date of Patent: Sep. 17, 2019

(54) TELESCOPE AND TELESCOPE ARRAY FOR USE IN SPACECRAFT

(71) Applicant: University of Florida Research Foundation, Inc., Gainesville, FL (US)

(72) Inventors: Bo Zhao, Gainesville, FL (US); Rafael Guzman, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 9 days.

(21) Appl. No.: 15/800,601

(22) Filed: Nov. 1, 2017

(65) Prior Publication Data

US 2018/0067291 A1 Mar. 8, 2018

Related U.S. Application Data

(63) Continuation of application No. 14/224,134, filed on Mar. 25, 2014, now Pat. No. 9,846,299.

(60) Provisional application No. 61/809,006, filed on Apr. 5, 2013.

(51) Int. Cl.
*G02B 17/08* (2006.01)
*G02B 23/06* (2006.01)

(52) U.S. Cl.
CPC ..... *G02B 17/0808* (2013.01); *G02B 17/0856* (2013.01); *G02B 17/0884* (2013.01); *G02B 23/06* (2013.01)

(58) Field of Classification Search
CPC .............. G02B 17/08; G02B 17/0804; G02B 17/0808; G02B 17/0856; G02B 17/0884; G02B 23/00; G02B 23/02; G02B 23/06; G02B 23/12; G02B 23/16; G02B 23/18
See application file for complete search history.

(56) References Cited

U.S. PATENT DOCUMENTS

| | | | |
|---|---|---|---|
| 2,649,791 A | 8/1953 | Braymer | |
| 2,670,656 A | 3/1954 | Braymer | |
| 3,119,892 A | 1/1964 | Shenker | |
| 3,527,526 A | 9/1970 | Silvertooth | |
| 3,711,184 A | 1/1973 | Amon et al. | |
| 4,061,420 A | 12/1977 | Kaprelian et al. | |
| 4,273,425 A * | 6/1981 | Canzek | G02B 17/0808 359/731 |
| 4,342,503 A | 8/1982 | Shafer | |
| 4,523,816 A | 6/1985 | Kreitzer | |

(Continued)

OTHER PUBLICATIONS

European Patent Office, Extended European Search Report for Application No. 15769292.2, dated Oct. 2, 2017, 10 pages, Germany.
Gelles, Rubin, "Aberrations of the Mangin mirror", *Optical Engineering*, Mar. 24, 1985, pp. 322-325, vol. 24, No. 2, SPIE, USA.
International Searching Authority, International Search Report and Written Opinion for International Application No. PCT/US2015/021996, dated Jul. 22, 2015, 11 pages, Korean Intellectual Property Office, Republic of Korea.
United States Patent and Trademark Office, Notice of Allowance for U.S. Appl. No. 14/224,134, dated Aug. 7, 2017, 23 pages, U.S.A.
United States Patent and Trademark Office, Office Action for U.S. Appl. No. 14/224,134, dated Sep. 15, 2015, 23 pages, U.S.A.

(Continued)

*Primary Examiner* — Derek S. Chapel
*Assistant Examiner* — Adam W Booher
(74) *Attorney, Agent, or Firm* — Alston & Bird LLP (57) ABSTRACT

A catadioptric telescope is a modified version of a conventional Maksutov-Cassegrain optical telescope. In accordance with the invention, the reflecting surfaces of the primary mirror and the secondary spot mirror are on the second surfaces of the primary mirror and correcting lens, respectively. In further accordance with the invention, two of these telescopes can be joined together to form a binocular telescope array. The array can be easily customized to suit different remote sensing/satellite applications.

19 Claims, 5 Drawing Sheets

(56) References Cited

U.S. PATENT DOCUMENTS

| | | |
|---|---|---|
| 4,709,989 A | 12/1987 | Maechler |
| 5,113,281 A | 5/1992 | Mandelboum et al. |
| 5,159,495 A | 10/1992 | Hamblen |
| 5,471,346 A | 11/1995 | Ames |
| 5,760,979 A | 6/1998 | Saito |
| 5,905,591 A | 5/1999 | Duncan et al. |
| 7,236,297 B1 | 6/2007 | Ackermann et al. |
| 7,631,839 B1 | 12/2009 | Duncan et al. |
| 9,846,299 B2 * | 12/2017 | Zhao .................. G02B 17/0808 |
| 2004/0233550 A1 | 11/2004 | Burr |
| 2007/0177261 A1 | 8/2007 | Murdock |
| 2008/0019022 A1 | 1/2008 | Mitchell |
| 2012/0248296 A1 | 10/2012 | Giulianini |
| 2013/0141608 A1 * | 6/2013 | Yilmaz .................. G02B 17/08 348/222.1 |
| 2014/0300959 A1 | 10/2014 | Zhao et al. |

OTHER PUBLICATIONS

United States Patent and Trademark Office, Office Action for U.S. Appl. No. 14/224,134, dated Mar. 30, 2016, 26 pages, U.S.A.
United States Patent and Trademark Office, Office Action for U.S. Appl. No. 14/224,134, dated Jul. 22, 2016, 26 pages, U.S.A.
United States Patent and Trademark Office, Office Action for U.S. Appl. No. 14/224,134, dated Feb. 3, 2017, 24 pages, U.S.A.
Yudin, Alexey N., et al., "Fast catadioptric telescopes for CCD observation of transient events and space surveillance", Optical Complex Systems: OCS11, Sep. 22, 2011, pp. 1-10, vol. 8172, No. 1, SPIE, USA.

* cited by examiner

TELESCOPE AND TELESCOPE ARRAY FOR USE IN SPACECRAFT

CROSS-REFERENCE TO RELATED APPLICATIONS

This application is a continuation of U.S. application Ser. No. 14/224,134, filed Mar. 25, 2014, which claims the benefit of U.S. Application No. 61/809,006, filed Apr. 5, 2013, the contents of which are hereby incorporated by reference in their entireties.

BACKGROUND

The invention relates to telescopes, and more particularly relates to optical telescopes that are capable of operation in the visible and near-infrared portions of the electromagnetic spectrum. In its most immediate sense, the invention relates to optical telescopes and optical telescope arrays that are suitable for use in spacecraft (such as satellites) and other remote sensing applications.

Universities use nanosatellites for research in astronomy, climatology, and earth science. And, use of nanosatellites for both commercial and governmental purposes has been contemplated. For example, a nanosatellite network could be used to monitor the entire length of a pipeline in order to prevent oil or gasoline thefts by detecting persons who bring unauthorized truck-sized vehicles in the pipeline's vicinity. Alternatively, nanosatellites can be used for e.g. border control (monitoring aircraft that may be transporting drugs, monitoring movements of guerrillas) or prevention of environmental disasters (such as international fires in large extensions of protected forests).

An optical telescope intended for use in a spacecraft such as a nanosatellite must meet demanding constraints. It must be small, light, well-balanced, and mechanically robust. It must also be easily customizable; some nanosatellite applications will require a wide field of view, while others will require high resolution images, and still others will require the ability to acquire spectroscopic data or polarimetry data.

Therefore, objects of the invention are to provide an optical telescope and an optical telescope array for use in spacecraft and remote sensing applications such as nanosatellites, which telescope and array are small, light, well-balanced, mechanically robust, and easily customizable.

Conventional catadioptric optical telescopes of the Maksutov-Cassegrain type have excellent mechanical features; they are small, light, well-balanced, and mechanically robust. However, when used at wavelengths of between 400 and 1000 nm (visible to near-infrared radiation, which are required for nanosatellite applications) they have unacceptable levels of astigmatism, coma, and color spherical aberrations. And customizing a conventional Maksutov-Cassegrain telescope to meet the requirements of different nanosatellite applications would be quite difficult.

The invention proceeds from two realizations. The first of these is the realization that if a conventional Maksutov-Cassegrain telescope design is modified to employ second-surface reflection for the primary mirror and the secondary spot mirror (instead of first-surface reflection, which is conventional) the optical aberrations of the original design can be brought within acceptable limits while still preserving its advantageous features insofar as size, weight, balance, and robust character are concerned.

The second realization is that by using a binocular array made up of two telescopes having such a modified design, customization can be accomplished easily and inexpensively. This can be done by changing the orientation of the telescopes with respect to each other, changing the coatings on the lenses, and changing the filters that are used. If for example the telescopes are parallel with each other so that their fields of view coincide to be the same at the intended distance from the satellite, a high-resolution image can be obtained. Alternatively, if an image of a large area is desired, the telescopes can be precisely disinclined so that the fields of view at the intended distance are non-overlapping. Acquisition of spectroscopic and polarimetry data can be accomplished by using suitable coatings on the lenses and suitable filters, and it is possible to acquire both image data and spectroscopic or polarimetry data by configuring one telescope to acquire an image while configuring the other to acquire the non-image data desired.

BRIEF SUMMARY OF SOME EXAMPLE EMBODIMENTS

The invention proceeds from two realizations. The first of these is the realization that if a conventional Maksutov-Cassegrain telescope design is modified to employ second-surface reflection for the primary mirror and the secondary spot mirror (instead of first-surface reflection, which is conventional) the optical aberrations of the original design can be brought within acceptable limits while still preserving its advantageous features insofar as size, weight, balance, and robust character are concerned.

The second realization is that by using a binocular array made up of two telescopes having such a modified design, customization can be accomplished easily and inexpensively. This can be done by changing the orientation of the telescopes with respect to each other, changing the coatings on the lenses, and changing the filters that are used. If for example the telescopes are parallel with each other so that their fields of view coincide to be the same at the intended distance from the satellite, a high-resolution image can be obtained. Alternatively, if an image of a large area is desired, the telescopes can be precisely disinclined so that the fields of view at the intended distance are non-overlapping. Acquisition of spectroscopic and polarimetry data can be accomplished by using suitable coatings on the lenses and suitable filters, and it is possible to acquire both image data and spectroscopic or polarimetry data by configuring one telescope to acquire an image while configuring the other to acquire the non-image data desired.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. The Figures are not to scale; dimensions have been enlarged or reduced for clarity.

Figure 1:
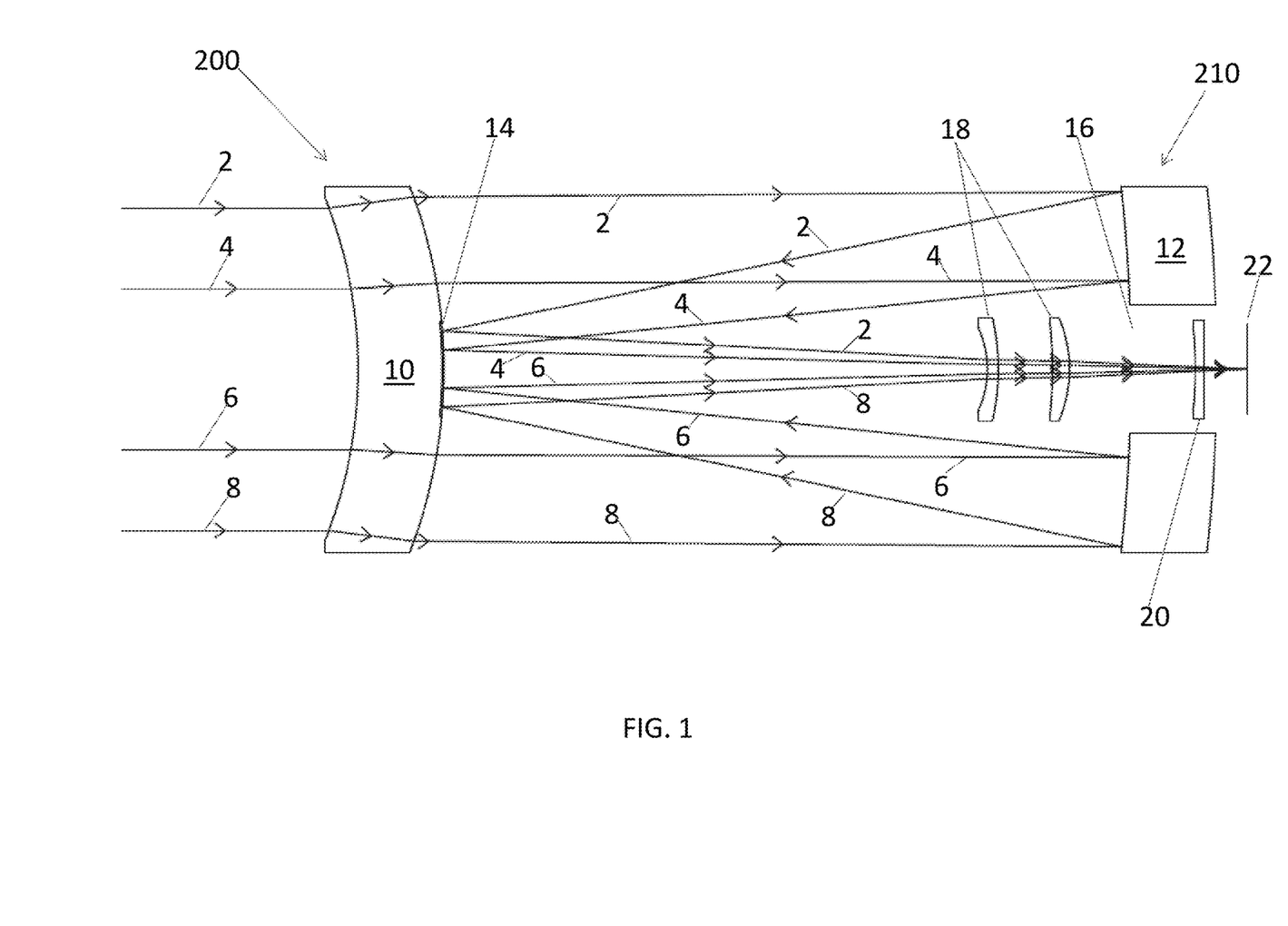
FIG. 1 is a schematic representation of the operation of a conventional catadioptric Maksutov-Cassegrain optical telescope.

FIG. 1 shows a schematic representation of how a conventional catadioptric Maksutov-Cassegrain optical telescope operates in the wavelength range of 400 nm to 1000 nm. Incoming rays 2, 4, 6, and 8 enter the entrance end 200 of the telescope through its spherical meniscus corrector lens 10, which is made of optical glass and disperses them radially outwardly. They then strike the spherical reflective surface of the primary mirror 12 (which has an aperture 16 in its center) and are reflected back toward the corrector lens 10, where they are made incident upon a secondary "spot" mirror 14. After reflection from the secondary spot mirror 14, the rays 2, 4, 6, and 8 are directed towards a circular aperture 16 that is located in the center of the primary mirror 12.

Each of the mirrors 12 and 14 is formed by a layer of reflective material located on the first surface of the mirror. (The term "first surface" is used because the ray of light is reflected from the first surface it encounters.) As a result, by the time the rays 2, 4, 6, and 8 have reflected off the secondary spot mirror 14, the image formed by those rays suffers from aberrations, which include distortion, astigmatism, coma, and color spherical aberration. Corrector lenses 18 are used to correct for these aberrations, and the rays 2, 4, 6, and 8 then pass through a field flattener lens 20 to become incident upon a sensor 22 (such as a CMOS sensor) at the exit end 210 of the telescope.

Figure 2:
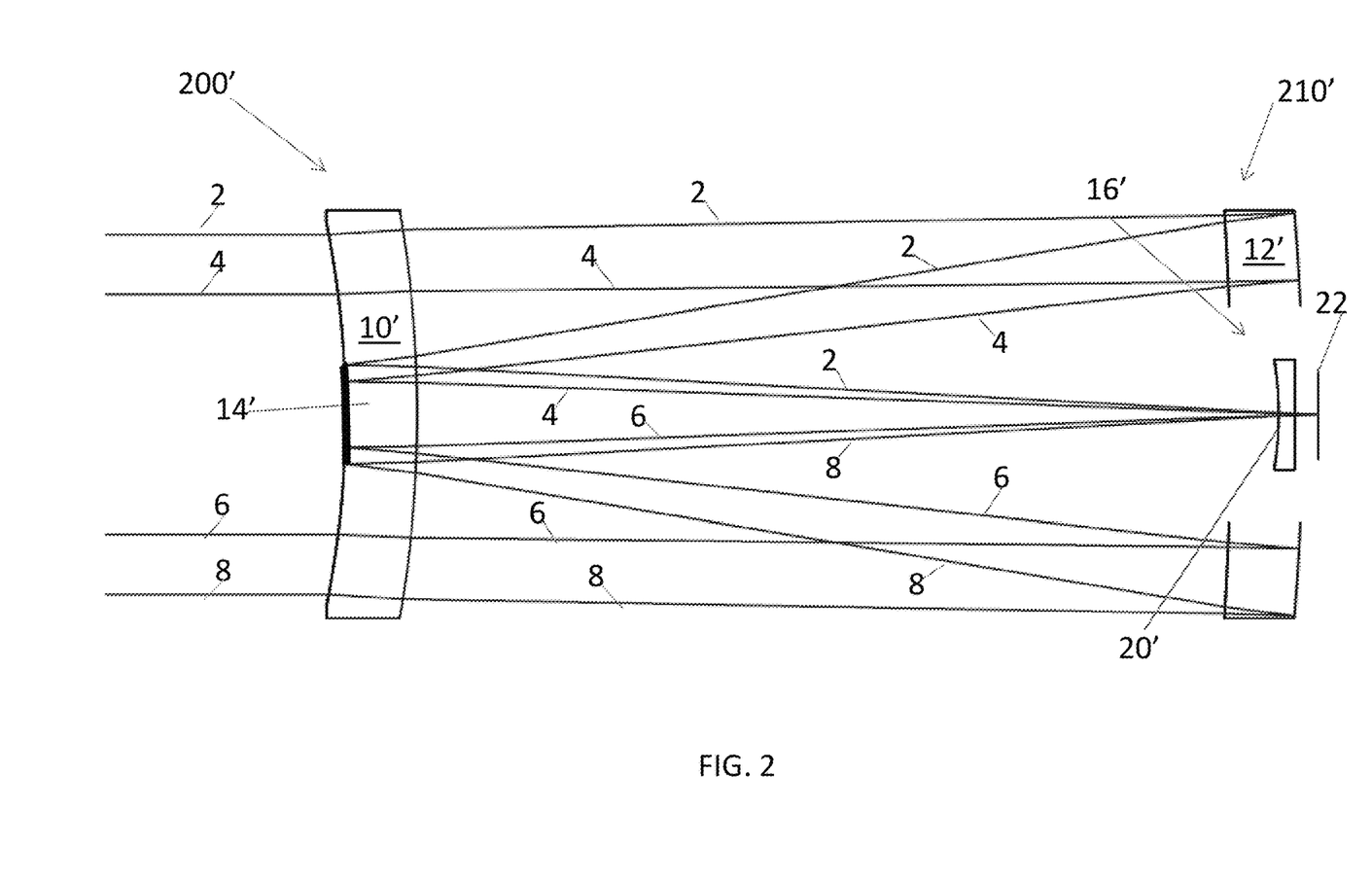
FIG. 2 is a schematic representation of the operation of a catadioptric optical telescope in accordance with the invention.

FIG. 2 is a schematic illustration of the operation of a telescope in accordance with the invention. Here, rays 2, 4, 6, and 8 are dispersed radially outwardly by a spherical meniscus corrector lens 10' at the entrance end 200' of the telescope and are incident upon the primary mirror 12'. The primary mirror 12', is of the Mangin type; it is a negative meniscus lens with a circular aperture 16' in its center. Here, the reflection is from the second surface of the primary mirror 12'; the primary mirror 12' is made of optical glass and the rays 2, 4, 6, and 8 pass through its first surface and are reflected only when they reach its second surface. The primary mirror 12' thus acts not only as a mirror, but also as a triplet lens (because the light rays are deflected twice, once when they enter the primary mirror 12' and once when they leave it).

After reflection from the second surface of the primary mirror 12', the rays 2, 4, 6, and 8 are made incident upon a secondary spot mirror 14' that is located on the second surface of the corrector lens 10'. As in the case of the primary mirror 12', the secondary spot mirror 14' also functions as a lens because the corrector lens 10' is a spherical meniscus lens.

As can be seen by comparing FIG. 1 and FIG. 2, a telescope in accordance with the invention does not require corrector lenses located between the corrector lens 10 or 10' and the primary mirror 12 or 12'. It requires only a field flattener lens 20', which is located ahead of the CMOS sensor 22 at the exit end 210' of the telescope.

Figure 3:
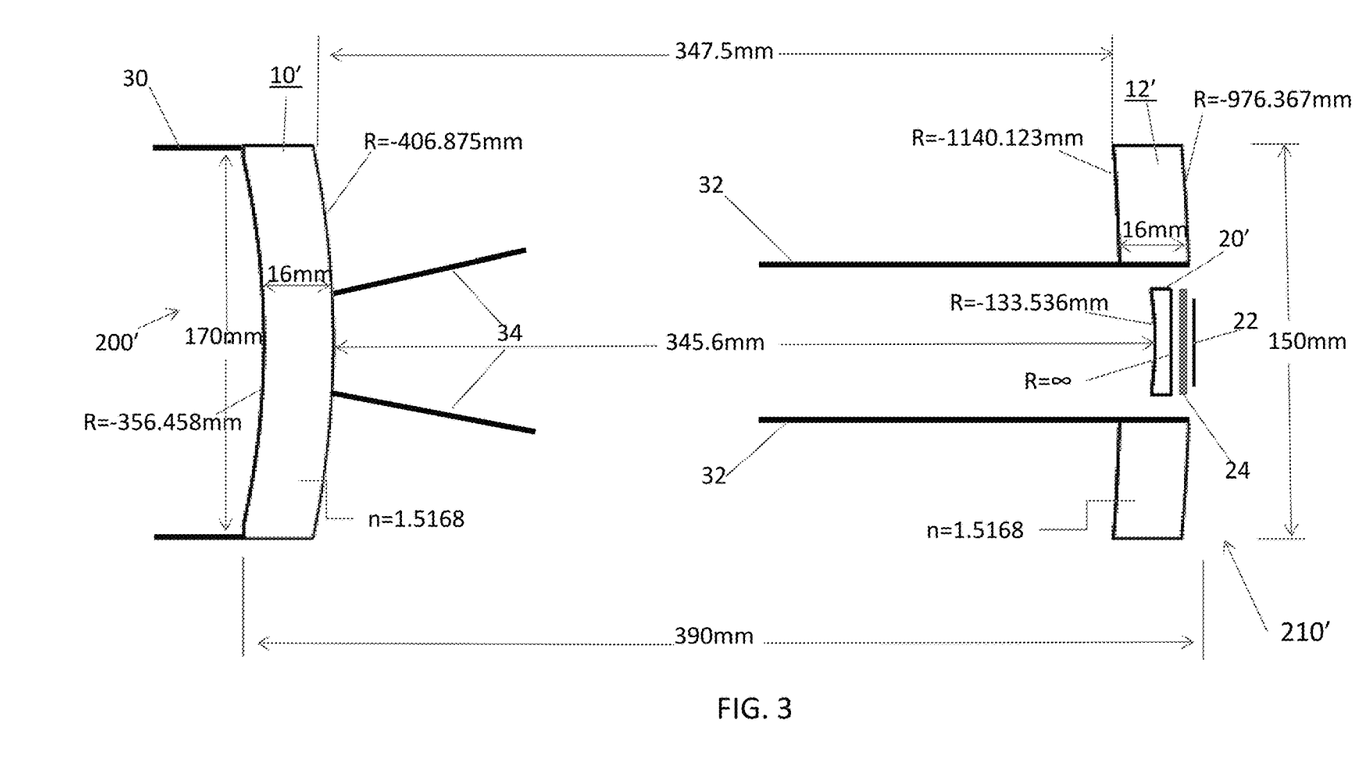
FIG. 3 is a schematic diagram of a telescope in accordance with a preferred embodiment of the invention.

FIG. 3 is a diagram schematically illustrating the dimensions of a preferred embodiment of a telescope in accordance with the invention. In this preferred embodiment:

a cylindrical baffle 30 is located in front of the corrector lens 10';

another cylindrical baffle 32 is located in front of the primary mirror 12';

a conical baffle 34 is located behind the corrector lens 10'; and a filter 24 is interposed between the field flattener lens 20' and the detector 22.

Baffles such as 30, 32, and 34 are conventionally used in Maksutov-Cassegrain optical telescopes; the baffles are made of aluminum and they block stray light. As will be discussed below, the filter 24 is selected in accordance with the data to be captured by the detector 22.

The glass used in the preferred embodiment shown in FIG. 3 is N-BK7, which has a refractive index n=1.5168. The focal length of this preferred embodiment is 1500 mm and its speed is f/10. At an intended observation distance of 700 km (i.e. the distance between a microsatellite in a 700 km orbit and at the earth) the preferred embodiment has a field of view that is 20 km in diameter.

In accordance with the invention, a binocular array of catadioptric optical telescopes is constructed. Advantageously, each of the telescopes is the above-discussed preferred embodiment of a telescope in accordance with the invention. As will become evident below, this permits the array to be easily and inexpensively customized for particular applications.

Figure 4:
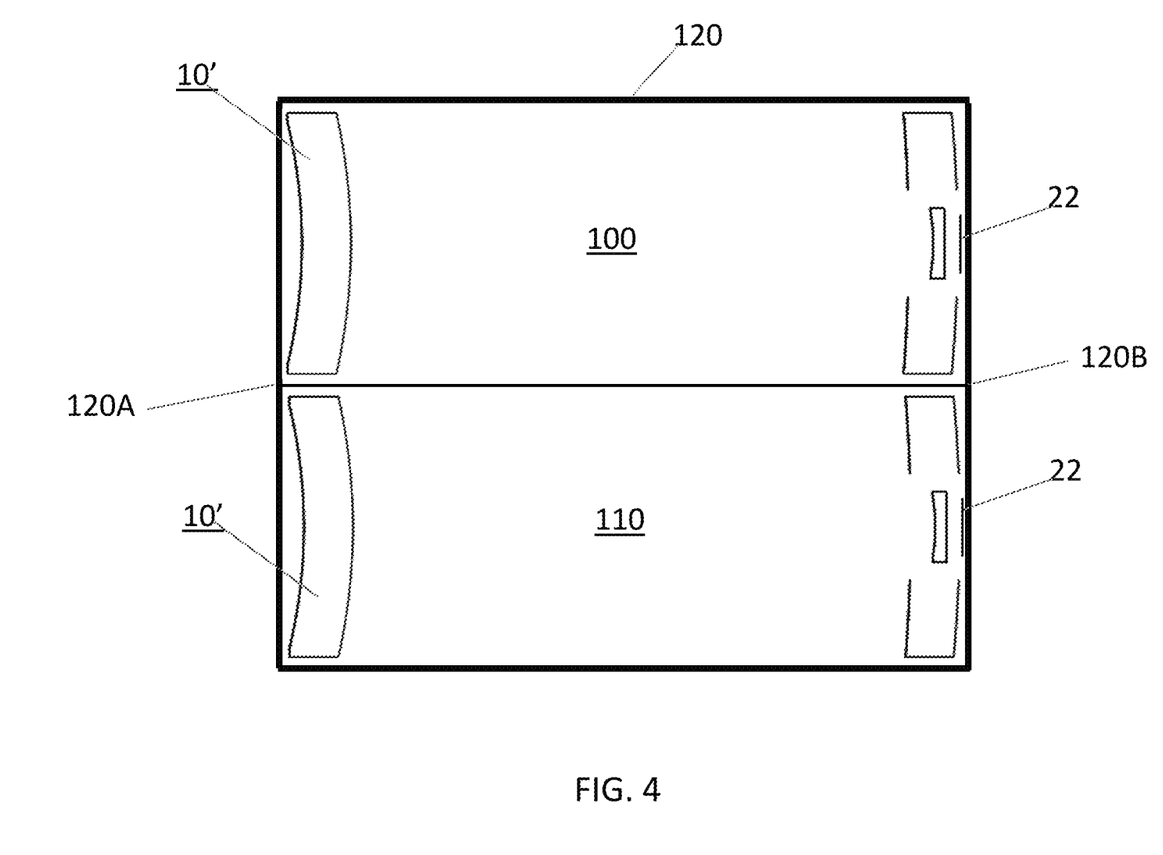
FIG. 4 is a schematic diagram of a binocular telescope array in accordance with the invention.

An array in accordance with the preferred embodiment is made up of two telescopes as described above. The telescopes 100 and 110 are mounted in a housing 120 (FIG. 4) made of a ceramic having the same thermal coefficient as the glass in the corrector lenses 10' and the primary mirrors 12'. The housing 120 has an entrance end 120A where the corrector lenses 10' are located and an exit end 120B where the CMOS sensors 22 are located.

Figure 5A:
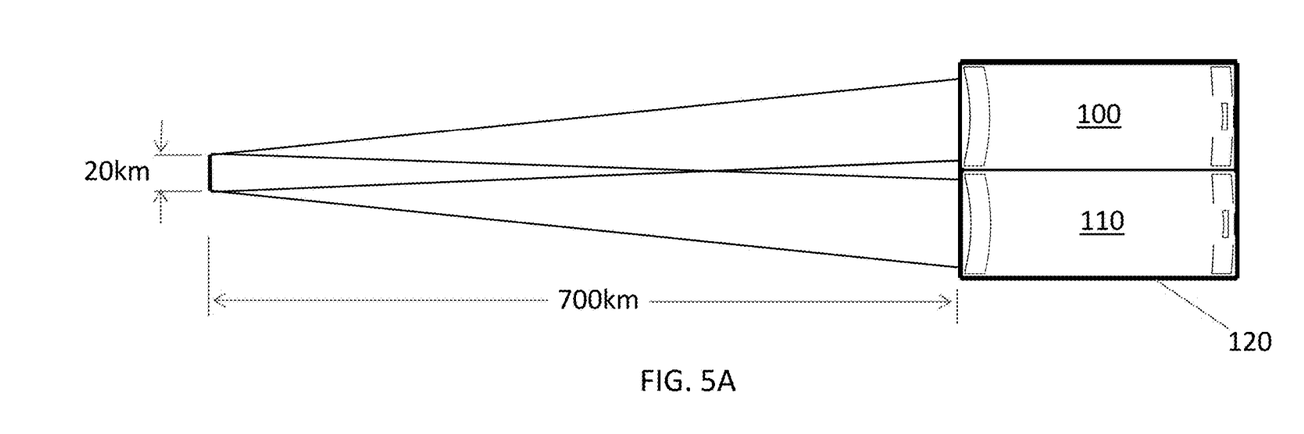
FIG. 5A is a schematic illustration of the operation of a first preferred embodiment of a binocular telescope array in accordance with the invention.
Figure 5B:
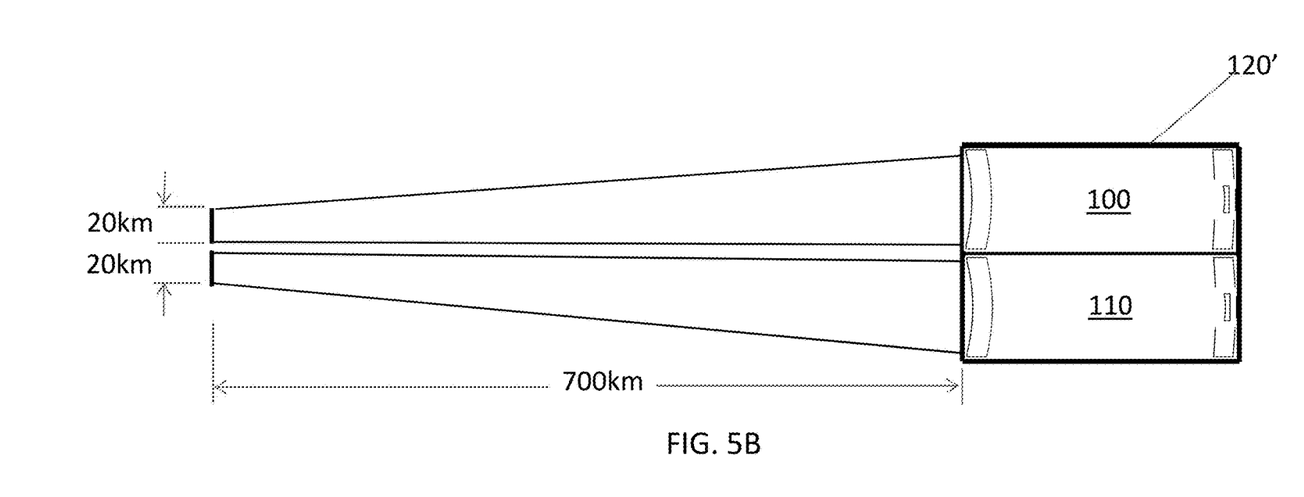
FIG. 5B is a schematic illustration of the operation of a first preferred embodiment of a binocular telescope array in accordance with the invention.

If a particular application requires a high-definition visual image, the housing 120 can be constructed with the axes of the telescopes 100 and 110 being non-parallel, whereby the telescopes 100 and 110 have the same approximately 20 km field of view at an intended observation distance of 700 km (FIG. 5A). At that distance, an array in accordance with the preferred embodiment can produce an image having a resolution of approximately 3 m. Alternatively, if it is more important to have a larger field of view, the housing 120' can be constructed with the axes of the telescopes 100 and 110 being parallel, whereby the array has a field of view that is approximately 40 km wide (FIG. 5B).

A telescope in accordance with the preferred embodiment can operate in the visual and near-infrared portions of the electromagnetic spectrum, between wavelengths of 400 nm and 1000 nm. To customize a telescope and a telescope array in accordance with the invention, the coatings on the various lenses and the filters 24 are chosen to correspond to optimize the performance of the telescope and array in the portion(s) of the electromagnetic spectrum that is or are of interest. Advantageously, BBAR antireflection coating is used on lens surfaces that transmit light, and protected silver is used for surfaces that reflect light. Typical filters 24 are precision band-pass filters working at different wavelength bands, such as 400 nm-700 nm and 700 nm-1000 nm. Furthermore, an array in accordance with the invention can be customized in such a manner that one of the telescopes is optimized to operate in the visual portion of the electromagnetic spectrum while the other is optimized to operate in the near-infrared so as to collect spectroscopic or polarimetry data. Alternatively, the array can be customized in such a manner that one of the telescopes is optimized to collect spectroscopic data while the other is optimized to collect polarimetric data. In such instances, the two telescopes will usually share the same field of view, so that acquired image data correlates with acquired infra-red data and so that acquired data from one portion of the electromagnetic spectrum correlates with acquired data from another portion.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A catadioptric optical telescope having a modified Maksutov-Cassegrain optical structure, comprising:
    an axially elongated housing having a generally cylindrical interior and entrance and exit ends;
    a spherical corrector lens mounted at the entrance end of the housing, the corrector lens comprising:
        first and second surfaces of the corrector lens, and
        a centrally located reflective coating located on the second surface of the corrector lens; and
    a primary mirror mounted at the exit end of the housing, the primary mirror comprising:
        a central aperture,
        first and second surfaces of the primary mirror, and
        a reflective coating located on the second surface of the primary mirror,
    wherein:
        the spherical corrector lens comprising the centrally located reflective coating is the forward most optical element of the optical structure;
        the corrector lens and primary mirror are axially aligned and have their respective first surfaces facing each other within the interior of the housing; and
        a volume defined collectively by the housing, the first surface of the corrector lens and the first surface of the primary mirror is free of optical components.

2. The telescope of claim 1, further comprising a field flattener lens located within the central aperture of the primary mirror and being axially aligned with the corrector lens and primary mirror.

3. The telescope of claim 2, further comprising a CMOS sensor that is in axial alignment with the field flattener lens and is located rearwardly thereof.

4. The telescope of claim 2, further comprising a filter that is in axial alignment with the field flattener lens and is located rearwardly thereof.

5. The telescope of claim 1, wherein the housing, corrector lens, primary mirror, and reflective coatings are chosen to optimize the telescope for use with radiation having wavelengths from approximately 400 nm to 1000 nm.

6. The telescope of claim 1, further comprising:
    a conical baffle located adjacent the first surface of the corrector lens;
    a cylindrical baffle located adjacent the first surface of the primary mirror; and
    a cylindrical baffle located adjacent the second surface of the corrector lens.

7. The catadioptric optical telescope of claim 1, wherein the first and second surfaces of the primary mirror are spherical surfaces.

8. The catadioptric optical telescope of claim 1, wherein (a) the primary mirror is a Mangin mirror, (b) the spherical corrector lens is a spherical meniscus corrector lens or (c) the primary mirror is a Mangin mirror and the spherical corrector lens is a spherical meniscus corrector lens.

9. The catadioptric optical telescope of claim 1, wherein:
    the corrector lens is constructed of a first material,
    the housing is constructed of a second material, and
    the second material is different from the first material.

10. A binocular telescope array for use in a spacecraft, comprising:
    an axially elongated housing having two chambers, each chamber having a generally cylindrical interior, the elongated housing having an entrance end and an exit end, and the two chambers having a fixed orientation with respect to one another;
    two catadioptric optical telescopes, each telescope being within one of the chambers and each telescope having a modified Maksutov-Cassegrain optical structure comprising:
        a spherical corrector lens mounted at the entrance end of the housing, the corrector lens comprising:
            first and second surfaces of the corrector lens, and
            a centrally located reflective coating located on the second surface of the corrector lens; and
        a primary mirror mounted at the exit end of the housing, the primary mirror comprising:
            a central aperture,
            first and second surfaces of the primary mirror, and
            a reflective coating located on the second surface of the primary mirror,
    wherein:
        the spherical corrector lens comprising the centrally located reflective coating is the forward most optical element of the optical structure;
        the corrector lens and primary mirror are axially aligned and have their respective first surfaces facing each other within the interior of the housing; and
        a volume defined collectively by a corresponding chamber of the housing, the first surface of the corrector lens and the first surface of the primary mirror is free of optical components.

11. The telescope array of claim 10, wherein both telescopes are oriented to have the same field of view at an intended observation distance.

12. The telescope array of claim 10, wherein both telescopes are oriented to have different fields of view at an intended observation distance.

13. The telescope array of claim 10, wherein one of the telescopes is configured to output image data and another one of the telescopes is configured to output spectroscopy data.

14. The telescope array of claim 10, wherein one of the telescopes is configured to output image data and another one of the telescopes is configured to output polarimetry data.

15. The telescope array of claim 10, wherein the telescopes are configured to observe different portions of the electromagnetic spectrum.

16. The binocular telescope array of claim 10, wherein the corrector lens is a spherical meniscus corrector lens.

17. The binocular telescope array of claim 10, wherein the primary mirror is a Mangin mirror.

18. The binocular telescope array of claim 10, wherein each of the two catadioptric optical telescopes further comprise a field flattener lens located within the central aperture of the primary mirror of the corresponding telescope and being axially aligned with the corrector lens and primary mirror of the corresponding telescope.

19. The binocular telescope array of claim 18, wherein each of the two catadioptric optical telescopes further comprise a CMOS sensor that is in axial alignment with the field flattener lens of the corresponding telescope and is located rearwardly thereof.

* * * * *